United States Patent [19]

Matyas et al.

[11] Patent Number: 4,993,069
[45] Date of Patent: Feb. 12, 1991

[54] SECURE KEY MANAGEMENT USING CONTROL VECTOR TRANSLATION

[75] Inventors: Stephen M. Matyas, Manassas, Va.; Dennis G. Abraham, Concord, N.C.; Donald B. Johnson, Manassas, Va.; An V. Le, Arlington, Va.; Rostislaw Prymak, Dumfries, Va.; John D. Wilkins, Somerville, Va.; Phil C. Yeh, Poughkeepsie, N.Y.

[73] Assignee: International Business Machines Corporation, Armonk, N.Y.

[21] Appl. No.: 443,418

[22] Filed: Nov. 29, 1989

[51] Int. Cl.$^5$ .............................................. H04K 1/00
[52] U.S. Cl. ...................................... 380/23; 280/25; 280/45
[58] Field of Search ............................. 300/21, 23–25, 300/45, 47

[56] References Cited

U.S. PATENT DOCUMENTS

| | | |
|---|---|---|
| 4,218,738 | 8/1980 | Matyas et al. . |
| 4,223,403 | 9/1980 | Konheim et al. . |
| 4,227,253 | 10/1980 | Ehrsam et al. . |
| 4,386,233 | 5/1983 | Smid et al. . |
| 4,500,750 | 2/1985 | Elander et al. . |
| 4,503,287 | 3/1985 | Morris et al. . |
| 4,558,176 | 12/1985 | Arnold et al. ...................... 380/23 |
| 4,578,530 | 3/1986 | Zeidler . |
| 4,620,276 | 10/1986 | Daniell et al. . |
| 4,683,968 | 8/1987 | Appelbaum et al. . |
| 4,723,283 | 2/1988 | Nagasawa et al. . |
| 4,723,284 | 2/1988 | Munck et al. . |
| 4,850,017 | 7/1989 | Matyas et al. . |
| 4,903,299 | 2/1990 | Lee et al. ............................. 380/25 |
| 4,918,728 | 4/1990 | Matyas et al. ...................... 380/21 |
| 4,924,514 | 5/1990 | Matyas et al. ...................... 380/24 |
| 4,924,515 | 5/1990 | Matyas et al. ...................... 380/25 |
| 4,941,176 | 7/1990 | Matyas et al. ...................... 380/21 |

OTHER PUBLICATIONS

R. W. Jones, "Some Techniques for Handling Encipherment Keys," ICL Technical Journal, Nov. 1982, pp. 175–188.
D. W. Davies & W. L. Price, "Security for Computer Networks," John Wiley & Sons, N.Y., 1984, Section 6.5, Key Management with Tagged Keys, pp. 168–172.

Primary Examiner—Thomas H. Tarcza
Assistant Examiner—Tod Swann
Attorney, Agent, or Firm—John E. Hoel

[57] ABSTRACT

A cryptographic system and method is provided which accepts a key K encrypted under a key formed by exclusive-ORing a key-encrypting key KK with a first control vector C5 and outputs the same key K encrypted under a key formed by exclusive-ORing KK with a second control vector C6. The set (C5, C6) represents a mapping of the type and usage of the key K defined by the control vector C5 to the type and usage defined by the control vector C6. The set of allowable control vector mappings, that is from C5 to C6, are defined in a control vector translation table, which is specified in advance by authorized installation personnel.

19 Claims, 9 Drawing Sheets

SECURE KEY MANAGEMENT USING CONTROL VECTOR TRANSLATION

BACKGROUND OF THE INVENTION

1. Technical Field

The invention disclosed broadly relates to data processing systems and methods and more particularly relates to cryptographic systems and methods for use in a data processing system to enhance security.

2. Related Patent Applications

The following co-pending patent applications are related to this invention and are incorporated herein by reference.

B. Brachtl, et al., "Controlled Use of Cryptographic Keys Via Generating Stations Established Control Values," U.S. Pat. No. 4,850,017, filed March 1987, and assigned to the IBM Corporation.

S. M. Matyas, et. al., "Secure Management of Keys Using Control Vectors," U.S. Pat. No. 4,941,176, filed Aug. 11, 1988, assigned to the IBM Corporation.

S. M. Matyas, et al., "Data Cryptography Operations Using Control Vectors," U.S. Pat. No. 4,918,728, filed Aug. 30, 1989, assigned to the IBM Corporation.

S. M. Matyas, et al., "Personal Identification Number Processing Using Control Vectors," U.S. Pat. No. 4,924,515, filed Aug. 24, 1989, assigned to the IBM Corporation.

S. M. Matyas, et al., "Secure Management of Keys Using Extended Control Logic," U.S. Pat. No. 4,924,514, filed Aug. 24, 1989, assigned to the IBM Corporation.

S. M. Matyas, et al., "Secure Management of Keys Using Control Vectors With Multi-Path Checking," Ser. No. 344,165, filed Apr. 27, 1989.

BACKGROUND ART

The above referenced co-pending patent applications, which are incorporated herein by reference, describe a cryptographic architecture for validating that key management functions requested for a cryptographic key in a data processing system, have been authorized by the originator of the key. In a network of cryptographic facilities supporting a variety of key distribution protocols, a method of supporting compatible key exchange is required while still ensuring controlled key usage. For example, a system A employing control vectors in the manner described in the above referenced patent applications, may be required to exchange keys with a variant-based system B whose variant definitions are not compatible with the control vector definitions of the system A. A means of translating keys to and from alternate variant forms is required to support compatibility. The mappings must be configurable by system administrators so as to enable the support of changes to network configuration, key usage requirements, and key distribution requirements. However, the translations must also be strictly controlled in order to prevent the misuse of the keys.

In another context, consider a key K to be imported by a control vector-based system A, similar to that described in the above referenced patent applications, the key K being transmitted from a non-control vector-based system B, wherein the key K is assigned a set of mutually exclusive usage attributes by the originator of the key in the system B. By mutually exclusive, it is meant that with respect to control vector definitions in the system A, the key K cannot be assigned a single operational control vector which permits the key to be used in the same way as it is to be used at the system B. Thus system A must have a means to translate a single key K into one or more copies of K, wherein each copy is assigned a different control vector. System A may want to group all the copies together under a single key label. When system B chooses to use key K in a particular way, system A must then choose the particular stored form of key K whose control vector permits K to be used in a like manner. Since this capability opens up system A to a variety of key usage attacks, it must be tightly controlled. Thus, only those translations which are required by the system A to permit compatibility with systems like system B, shall be permitted.

OBJECTS OF THE INVENTION

It is therefore an object of the invention to provide a secure method for compatible key management in a cryptographic network supporting a variety of key distribution protocols.

It is another object of the invention to provide a flexible and secure method for controlling key usage using control vectors in a heterogeneous key distribution environment.

It is an object of the invention for the system to provide a method to securely manage keys.

It is a further object of the invention to provide a mechanism that permits one system to be compatible with another system, controlling the usage of those keys.

It is a further object of the invention to permit one system to securely control the usage of keys with a system using an alternate key management control.

It is another object of the invention to map a single key K with a set of type and usage attributes in a system A with a first CV architecture to a multiplicity of stored forms of the key K, each form having a subset of those usages and corresponding to control vectors within a second CV architecture.

It is still a further object of the invention to provide a method to translate, or map, key type/usage definitions from one system to another.

It is a further object of the invention to provide a method which permits translation of a single key type/usage to one or more alternative key type/usages.

It is still a further object of the invention to provide a method which permits translation of both import and export key forms.

It is still a further object of the invention to provide a flexible method to define the key type/usage translation function which permits translations to be defined by authorized system personnel.

It is still a further object of the invention to provide a method of restricting the key type/usage translation function, such that only those mappings which have been specified by authorized system personnel, may be performed.

It is still another object of the invention to provide a method of authenticating the key type/usage translation function to prevent unauthorized substitution or modification of the translation.

SUMMARY OF THE INVENTION

These and other objects, features and advantages of the invention are accomplished by the secure key management using control vector translation, disclosed herein. A cryptographic method and apparatus are provided which accept a key K encrypted under a key formed by exclusive-ORing a key-encrypting key KK with a first control vector C5, and outputs the same key K encrypted under a key formed by exclusive-ORing KK with a second control vector C6. Thus, the set (C5, C6) represents a mapping of the type and usage of key K defined by C5, into the type and usage defined by C6. The set of allowable control vector mappings, that is from C5 to C6, are defined in a control vector translation table, which is specified in advance by authorized installation personnel.

The control vector translation table consists of entries which are arranged in two halves. Each half of an entry contains masking vectors which are encrypted under a cryptovariable encrypting key. The left half entries are encrypted under a first key and the right half entries are encrypted under a different key. Thus, although the two halves of each entry are equal, the cipher text forms in the control vector translation table are not equal.

The masking vectors from the control vector translation table are used in logical combinations with the specific control vectors C5 and C6 to produce a set of values which are compared for a quality with a set of predetermined values. The comparison for equality represents the test for validity of the control vector translation specified by control vectors C5 and C6.

The masking vectors are also used in logical combinations with the control vectors associated with the key-encrypting key KK, to augment the standard control vector checking for these control vectors described in the above referenced patent applications. By carefully setting up the masking vectors, system personnel can require the checking of certain bits in each of the control vectors for certain values before permitting the requested translation to occur. If any of the standard or augmented checking fails, then the translation of the key K from C5 to C6, will not be performed. In this manner, the control vector translation table permits authorized system personnel to control translations based not only on the values of C5 and C6, but also on the attributes assigned to the key-encrypting keys under which the key K is to be translated.

This results in the provision of a secure method for compatible key management in a cryptographic network supporting a variety of key distribution protocols. A flexible and secure method for controlling key usage using control vectors in a heterogeneous key distribution environment, is provided.

BRIEF DESCRIPTION OF THE DRAWINGS

These and other objects, features and advantages of the invention will be more fully appreciated with reference to the accompanying figures.

DESCRIPTION OF THE BEST MODE FOR CARRYING OUT THE INVENTION

Figure 1:
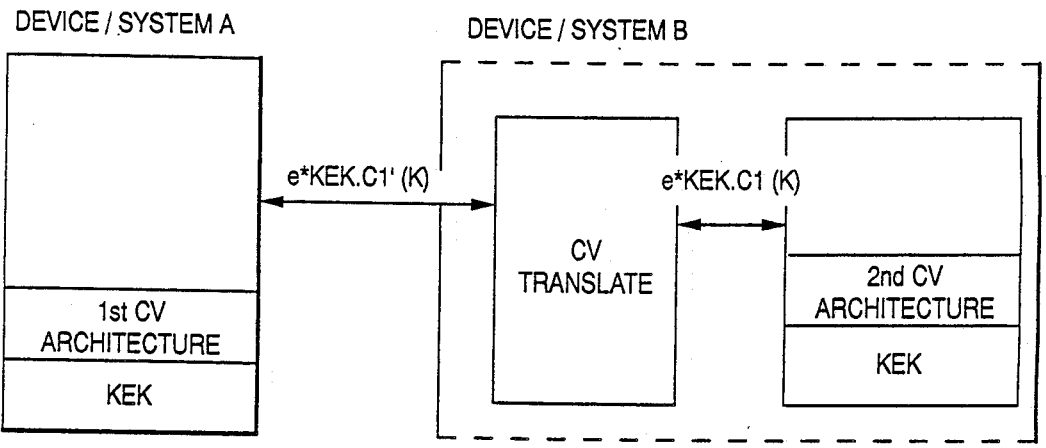
FIG. 1 is a schematic diagram illustrating how device B provides compatibility with device A via control vector translation.

In FIG. 1, we have a device or system A consisting of a first CV architecture and a device or system B based on a second control vector architecture and these two systems wish to communicate or share a cryptographic key K. This figure shows a distribution of a key K encrypted under a key-encrypting key KEK which has been exclusive-ORed with a control vector C1'. In system B, that key K must be translated from control vector C1' to a second control vector C1 using an intermediate step CV translate. That key distribution can be an export from system B to system A or it can be an import from system A into system B. The key KEK is stored in both systems.

In FIG. 2, again shows a device for system A which contains a non-CV architecture, that is a system whose method for controlling the usage of keys on the link or between systems uses no control vector or equivalently a zero control vector. There is a system B again, which is based upon a CV architecture and again in the process of distributing a key K from system A to system B, it is required that key K be encrypted under KEK with no control vector. In system B an intermediate step of CV translation occurs to translate the zero control vector to or from a control vector C1.

Figure 2:
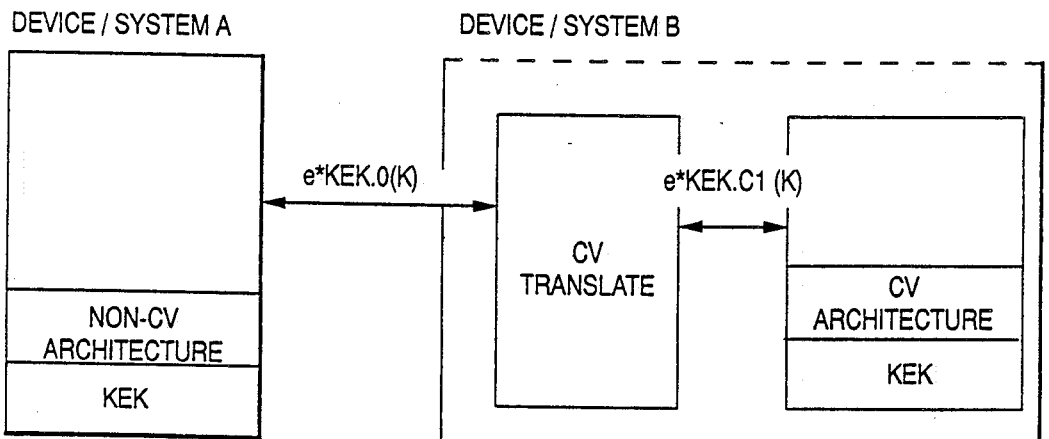
FIG. 2 is a schematic diagram illustrating how device B provides compatibility with a non-control vector device A via control vector translation.
Figure 3:
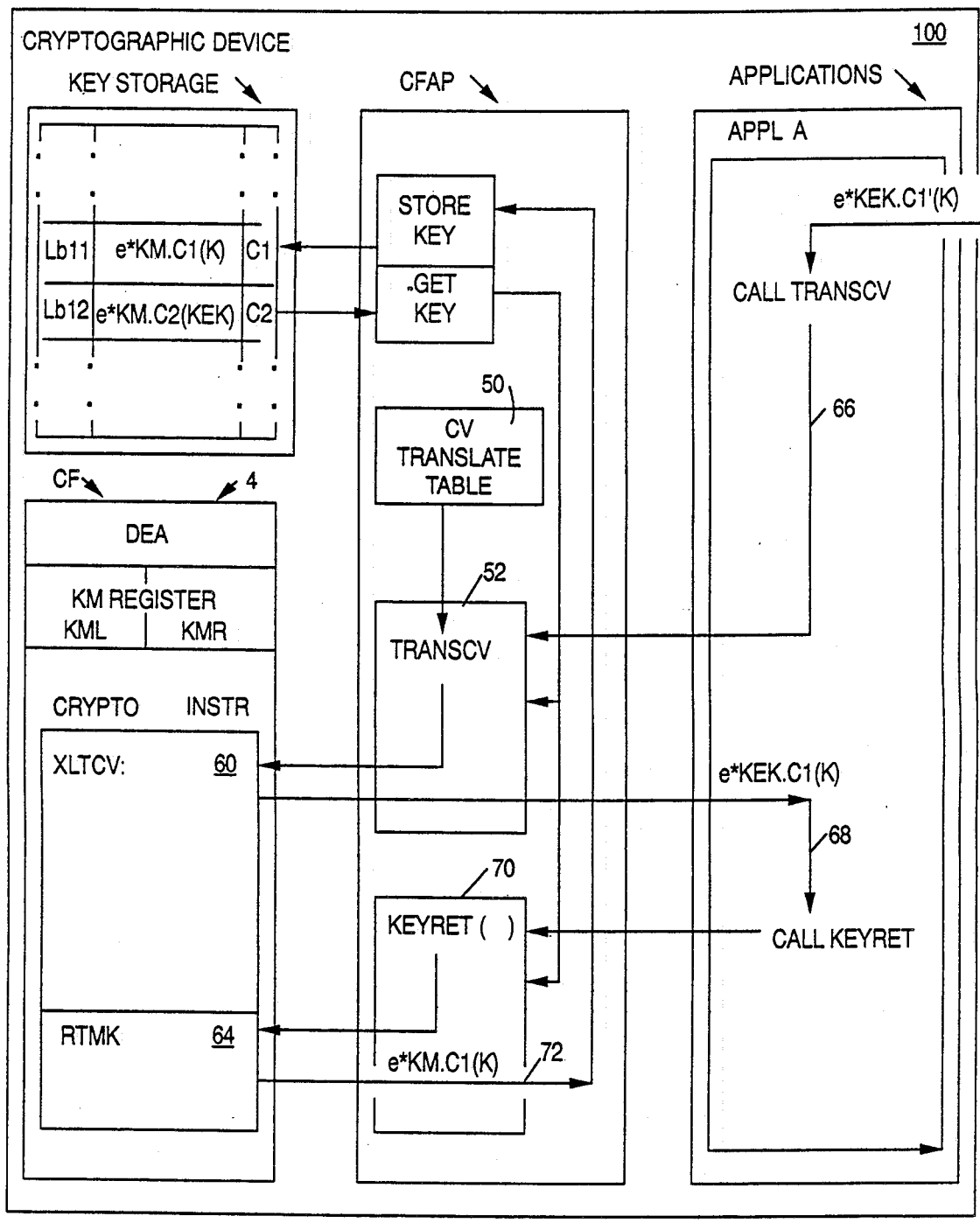
FIG. 3 is a more detailed architectural diagram illustrating a cryptographic device for the importation of the key K with an intermediate control vector translation.

FIG. 3 represents one application of the prior figures in which a key K is to be imported into a cryptographic device using intermediate CV translation. An application A receives from another system, a key K which has been encrypted by a key formed by the exclusive-OR of a key-encrypting key KEK with a control vector C1' where C1' could be a control vector from an alternate control vector architecture, as represented by FIG. 1 or a non-control vector architecture, represented in FIG. 2 as a control vector of zero. Application A then calls a Cryptographic Facility Access Program function (CFAP) called TRANSCV. TRANSCV in turn accesses the CV translate table and the operational form of the key-encrypting key KEK from key storage and uses those parameters as well as other parameters to pass at the applications to CFAP interface to invoke the translate CV instruction (XLTCV) located in the Cryptographic Facility 4. The translate CV instruction then performs the CV translation translating C1' to C1 and outputting the key K in a form of the key K encrypted under a key form by exclusive-ORing the key-encrypting key KEK with control vector C1. That value is returned through the CFAP back to application A wherein application A then calls another CFAP function called KEYRET, passing the translated form of the key K to KEYRET. KEYRET in turn calls a CF instruction RTMK to re-encipher the key K from encryption under a key formed by the exclusive-OR KEK and control vector C1 to encryption of key K under the master key exclusive-ORed with a control vector C1. That value is returned to CFAP who then stores that form of the key, which is known as an operational form of the key K into the key storage via a store key function of CFAP. Control is returned to the application A indicating success of the operation. In essence, what this process has done, is received a key K which is being imported under a key-encrypting key using an alternate control vector architecture and basically through an intermediate CV translation, putting that key into operational form using a control vector associated with this particular cryptographic device, in other words, its control vector architecture.

Figure 4:
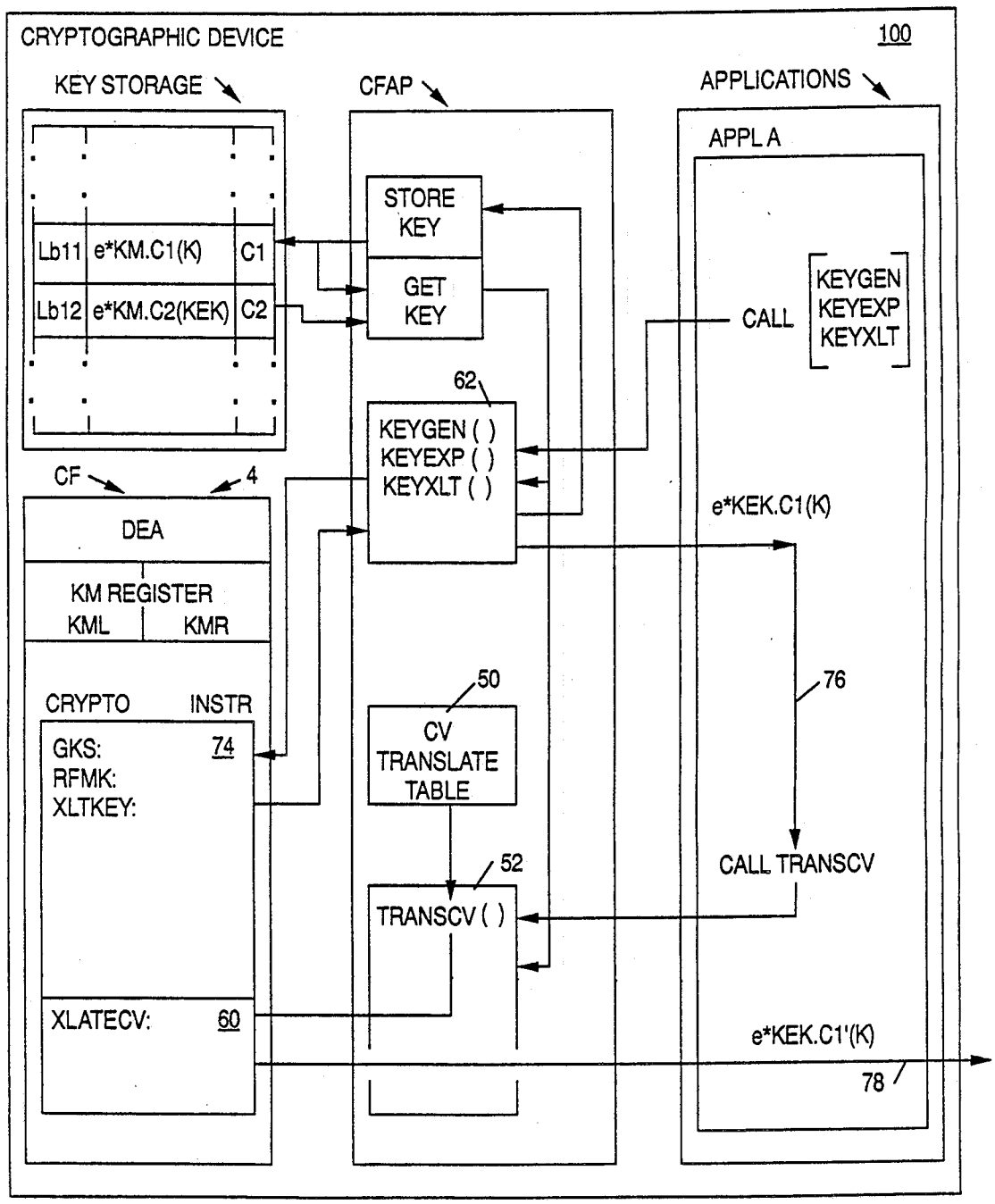
FIG. 4 is an architectural diagram of a cryptographic device illustrating the exportation of the key K with an intermediate control vector translation.

FIG. 4 describes the export of a key K from a cryptographic device 100 to another cryptographic system as represented by either FIG. 1 or FIG. 2, that is, to a system that has either an alternate CV architecture or in fact has a non-CV architecture. Similarly, an application A may either generate a key or it may take an existing key from key storage and export it by using the key function of CFAP or it may in fact be translating a key that is in import form and translated to export form. In any case, the application A seeks to form a key K and encrypt that key K under a key-encrypting key KEK exclusive-ORed with a control vector C1. That key K is said to be in export form. In order to export the key to one of those alternate CV architecture based systems, we must perform an intermediate CV translation to essentially translate the control vector from C1 to C1' which is the control vector that the alternate system would understand. C1' could in fact be zero, as represented in FIG. 2. Taking that export form of the key K, the application then calls a function trans CV and within CFAP, trans CV accesses keys from key storage 22 and one entry from the CV translate table 50 and formulates those parameters and invokes an instruction XLATE CV, which then performs the CV translation and returns the key K encrypted under the key-encrypting key KEK exclusive-ORed with control vector C1' and that export form of the key K is now transmitted to the alternate system. Because we are using C1', it is in a form that the alternate system would understand.

Figure 5:
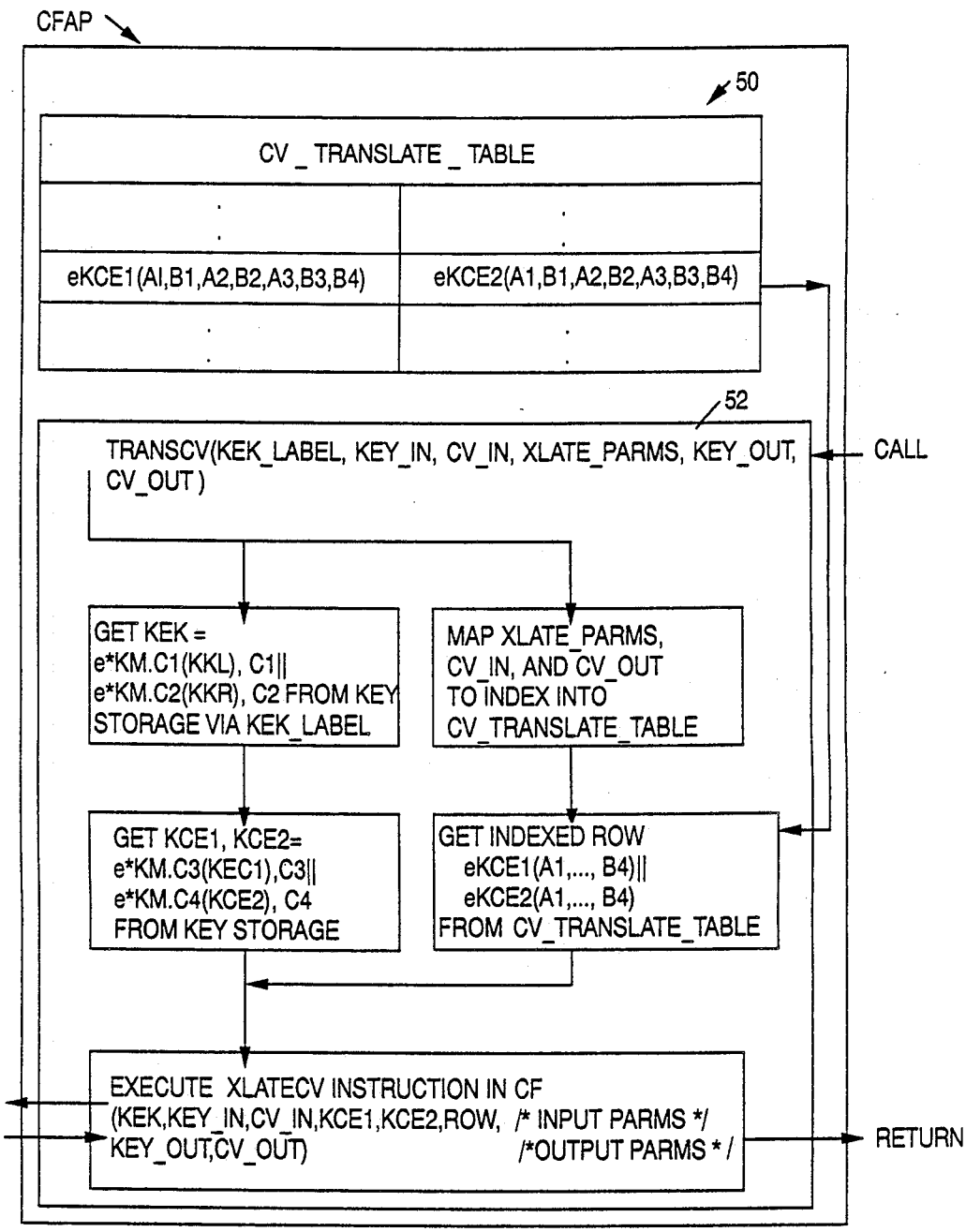
FIG. 5 is a more detailed block diagram of the organization of a Crypto Facility Application Program, illustrating the translation control vector function.

FIG. 5 essentially provides detail of the translate CV function in software, that is within the CFAP. CFAP's job in general is to provide a logical interface between application programs seeking to do translate CV functions and the translate CV instruction within the Cryptographic Facility. What this diagram shows is that there is a call to a trans CV function within CFAP which is labeled 52, to which is passed a number of parameters. For example a label which points to a key-encrypting key, the key itself which is to be translated labeled KEYIN, the input control vector labeled CVIN, a set of translate parameters which are used to define what form of translation is to be performed, and then possibly a couple of output parameters KEYOUT and CVOUT. KEYOUT is the translated form of the key to be translated. CVOUT may in fact be an input or an input and output parameter wherein it may specify what output control vector to use, or in fact may be a control vector returned to you telling you what the control vector was assigned to on the basis of the translate parameters that you specified. At any rate, the translate CV function TRANSCV uses those parameters to, for example, access the key KEK from key storage via the specified KEK label. It may take the translate parameters as well as the input CVIN and CVOUT to index into the CV translate table to get a particular row of that table for use during the CV translation. In addition, the translate CV function must access the cryptovariable encrypting keys KCE1 and KCE2 which are stored in operational form in key storage. After accessing all of the appropriate parameters that are needed to invoke the CF hardware instruction XLATECV, those parameters are passed to XLATECV which then performs the CV translation. If it fails because of an illegal request, an appropriate condition code may be returned instead which says that the instruction was not able to be executed. If successful, the translated key is then returned back to the calling application, which is indicated in FIG. 5.

Figure 6:
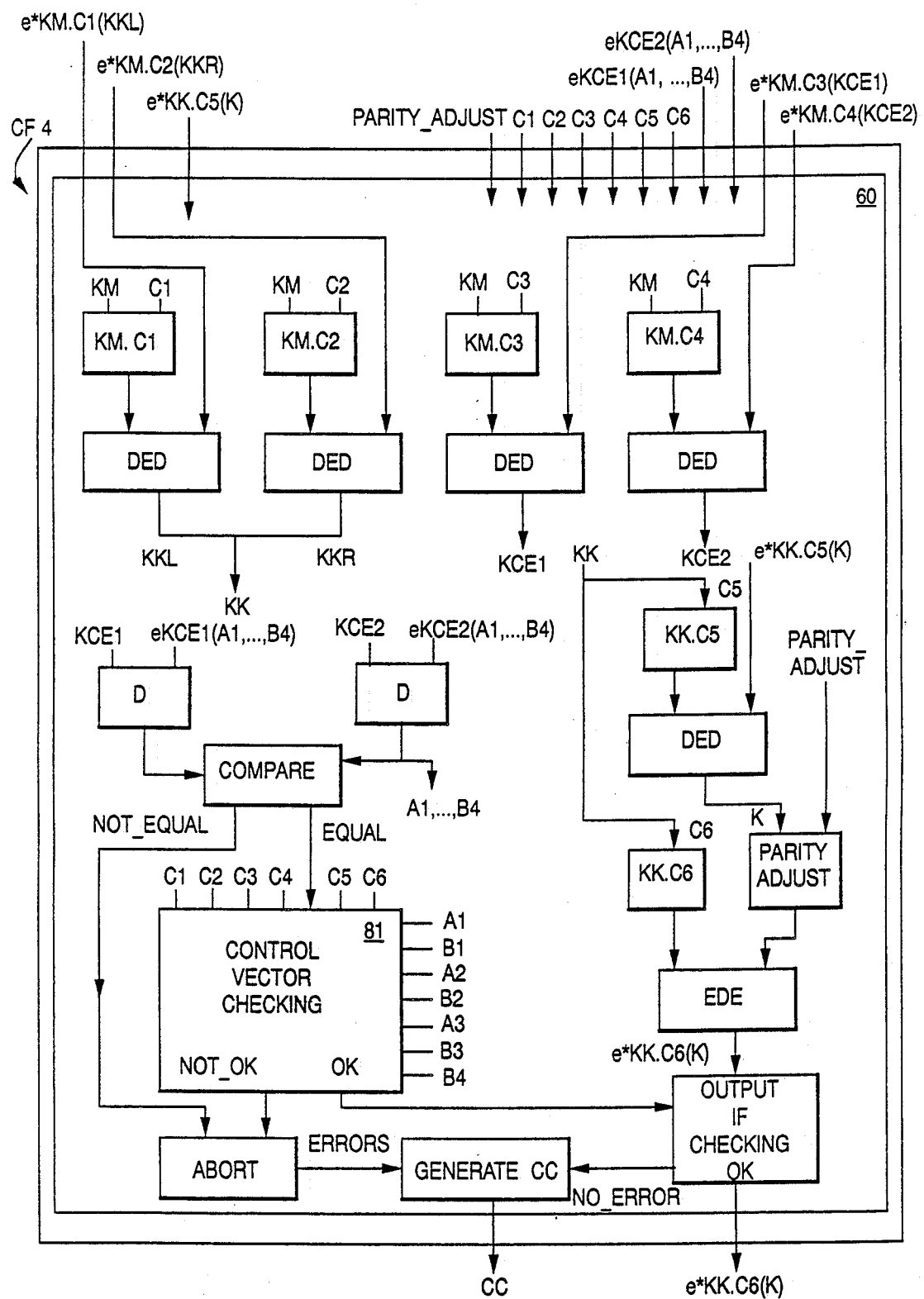
FIG. 6 is a more detailed block diagram of a Crypto Facility which performs the translation of a control vector.

FIG. 6 is a detailed block diagram of the translate control vector instruction (XLATECV) cell located within the Cryptographic Facility 4. Essentially, it accepts inputs at the top. The key-encrypting key is supplied in two 64-bit parts, KKL and KKR which are each encrypted under the master key with appropriate control vectors. The key K to be translated is input in the form e*KK.C5(K), i.e., key K encrypted under the exclusive-OR of the key-encrypting key KK with control vector C5. A parity adjustment control is the entry from the CV translation table which is input in two parts, one encrypted under the cryptovariable encrypting key KCE1 and its duplicate which is encrypted under cryptovariable encrypting KCE2. The operational forms of the cryptovariable encrypting keys KCE1 and KCE2 are also input. The control vectors associated with each of the operational key forms are input as C1, C2, C3 and C4. The control vector associated with the input and output forms of the key to be translated, C5 and C6, are also input. In this instruction, we basically have sets of components that recover all of the operational keys and put them in plaintext form internal to the CF. We have a segment that decrypts the key K from encryption under KK.C5 and re-encrypts it with optional parity adjustment to encryption under KK.C6 as requested. That output is then gated based upon control vector checking 14. Control vector checking is gated based upon two different conditions. One is that the left and right plaintext forms of the masking vectors A1–B4 must be equal to one another. If they are not equal, the instruction is aborted and no output occurs. If however those two portions of the CV translate table are equal, then the control vector checking is executed. Control vector checking consists of basically two parts. There is normal control vector and augmented control vector checking, which will be detailed in a later figure. The result of this control vector checking is either okay or not-okay signal that either authorizes the output of the translated key or not, in which case the execution is aborted and an appropriate condition code is returned to CC to indicate the reason for that failure.

Figure 7:
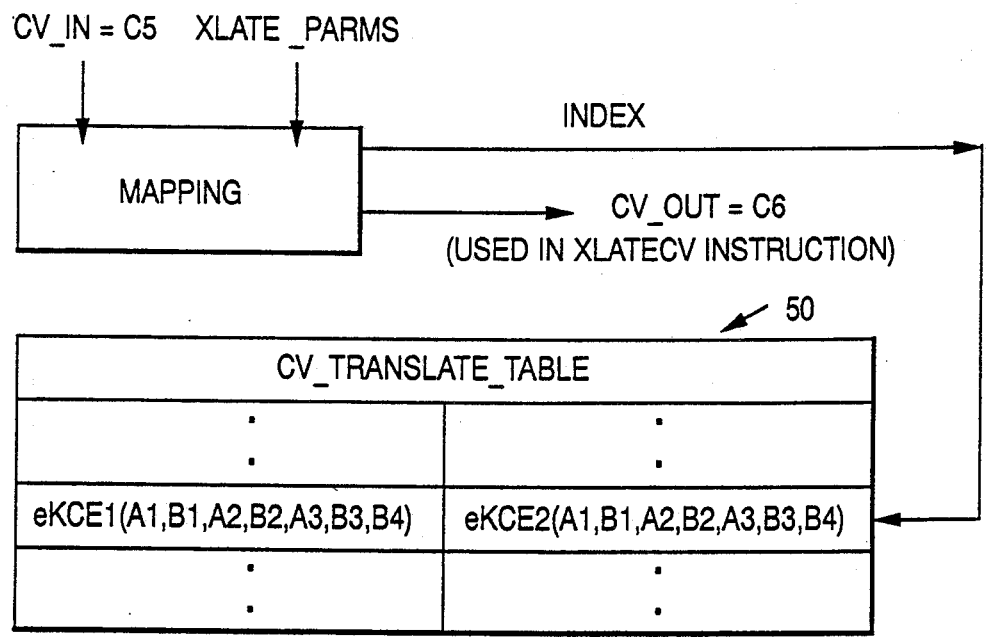
FIG. 7 is a schematic diagram illustrating the mapping to a translate table index and to output a control vector, based on an input control vector and other translate parameters.
Figure 8:
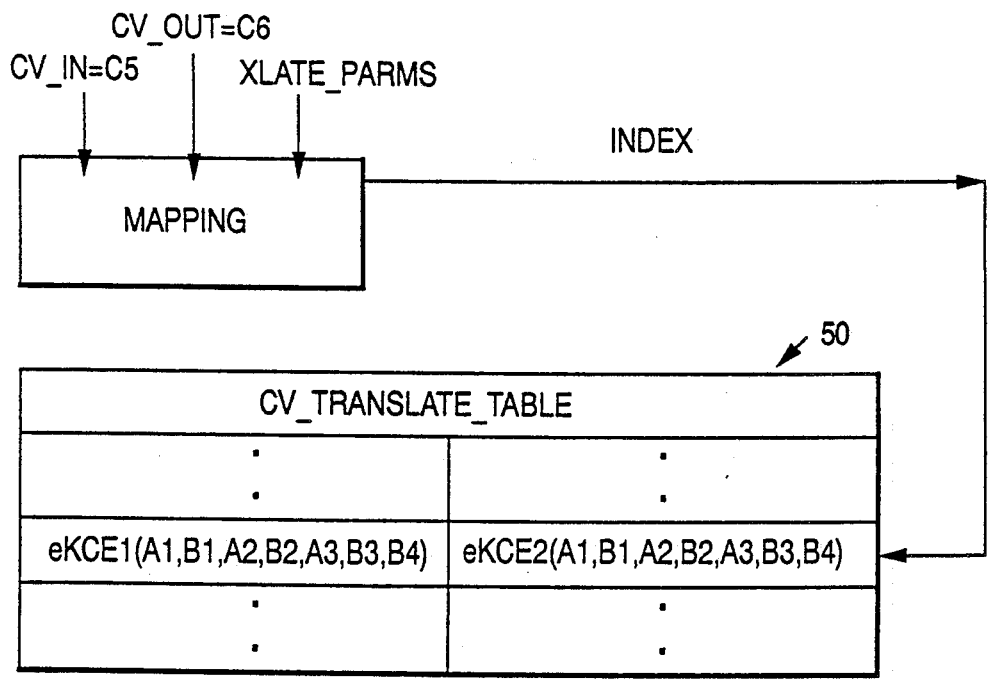
FIG. 8 is a schematic diagram of a mapping to illustrate a translate table index, based upon an input control vector, an output control vector and other translate parameters.

FIG. 7 and FIG. 8 are essentially two methods for mapping at the CFAP level, mapping a translate table index to an output CV labeled C6. In this case, they are based upon the input CV which is C5 and possibly some translate parameters passed by the application program. There is a mapping function that takes the input CV and those translate parameters and produces two outputs: an index which is used to choose a particular row of the CV translate table and a second output CVOUT labeled C6 at the instruction level that is actually used in the call to the translate CV (XLATECV) instruction. That CV is the CV used on the output form of the translating key.

In FIG. 8, the mapping is done in a slightly different manner. In this particular case, both the input CV and the requested output CV are input to the mapping function, as well as possibly a few translate parameters to distinguish among cases where C5 and C6 do not uniquely identify a single index, but the index being the only output against a particular entry of the CV translate table.

Figure 9:
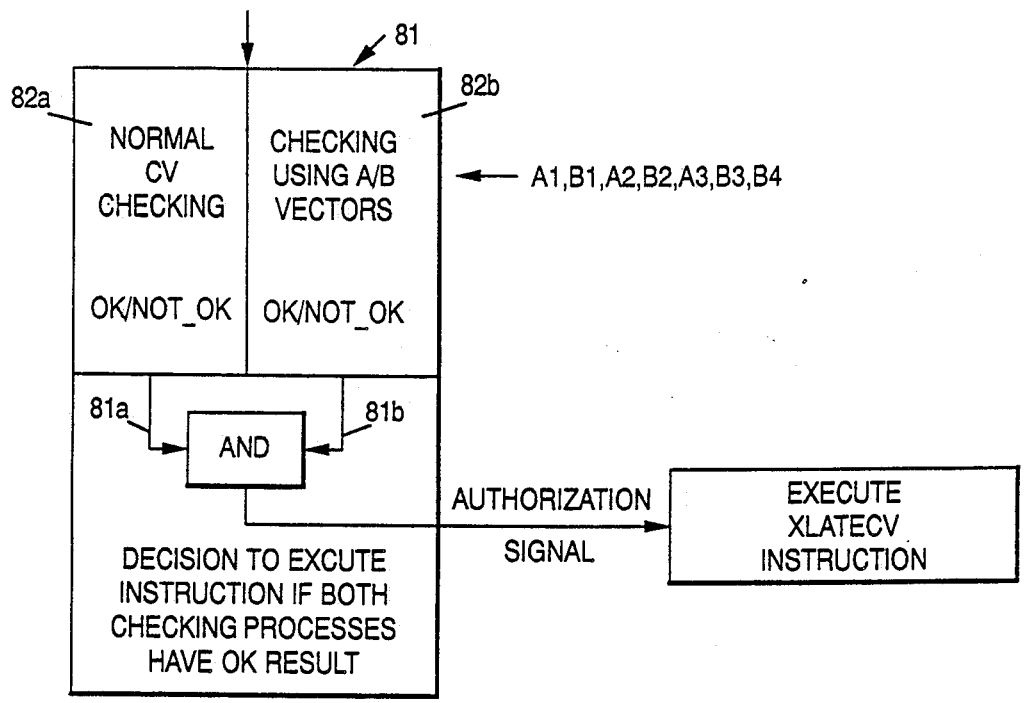
FIG. 9 is a schematic diagram illustrating the control vector checking process.

FIG. 9 is a more detailed drawing of the CV checking process located within the Cryptographic Facility. We have a set of control vectors C1, C2, C3, C4, C5 and C6 and a set of masking vectors A1 through B4. The normal CV checking is performed on C1, C2, C3 and C4 and essentially, its purpose is to ensure that the key to be translated K is in fact supplying the instruction encrypted under a key-encrypting key KK. The supply KK is in fact a key-encrypting key. C3 and C4 are just checked to make sure that the cryptovariable encrypting keys that are supplied to the instruction are exactly that, just cryptovariable encrypting keys. The remainder of the control vector C4, C5 and C6 are only checked using the augmented checking which is in the right-hand side labeled as checking using the AB vectors. In this case, not shown in detail, but the masking vectors are used in logical combination with the various control vectors C4, C5, C6, as well as C1 to verify that the requested translation from C5 to C6 is a permitted translation. The output of those two CV checking modes, normal CV checking and the checking using AB vectors are logically ANDed together. In other words, both of those checkings must be okay. Presuming that to be true, then that generates an authorization signal within the Cryptographic Facility, which permits the translate CV instruction to execute or more specifically, permits the output of the translate CV process to be gated to the output.

Figure 11:
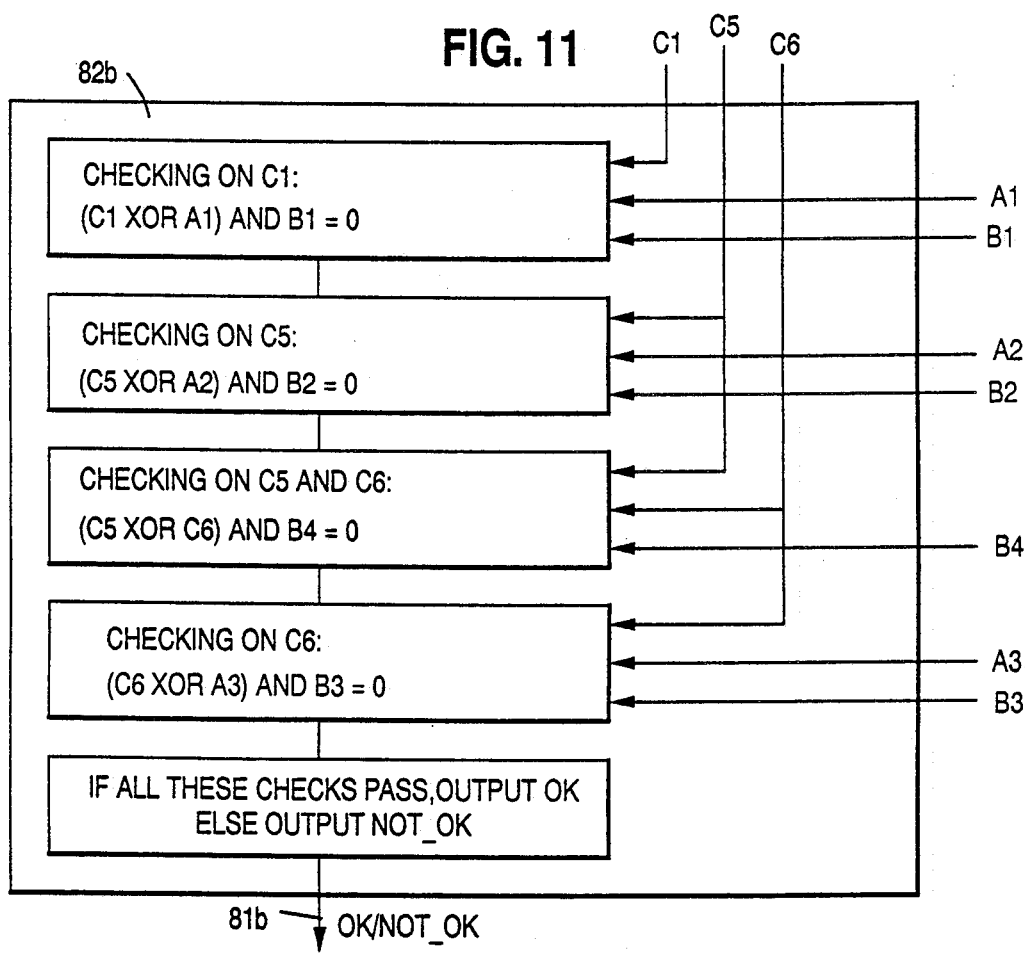
FIG. 11 is a schematic diagram illustrating the checking using the A and B vectors in the control vector checking process.
Figure 10:
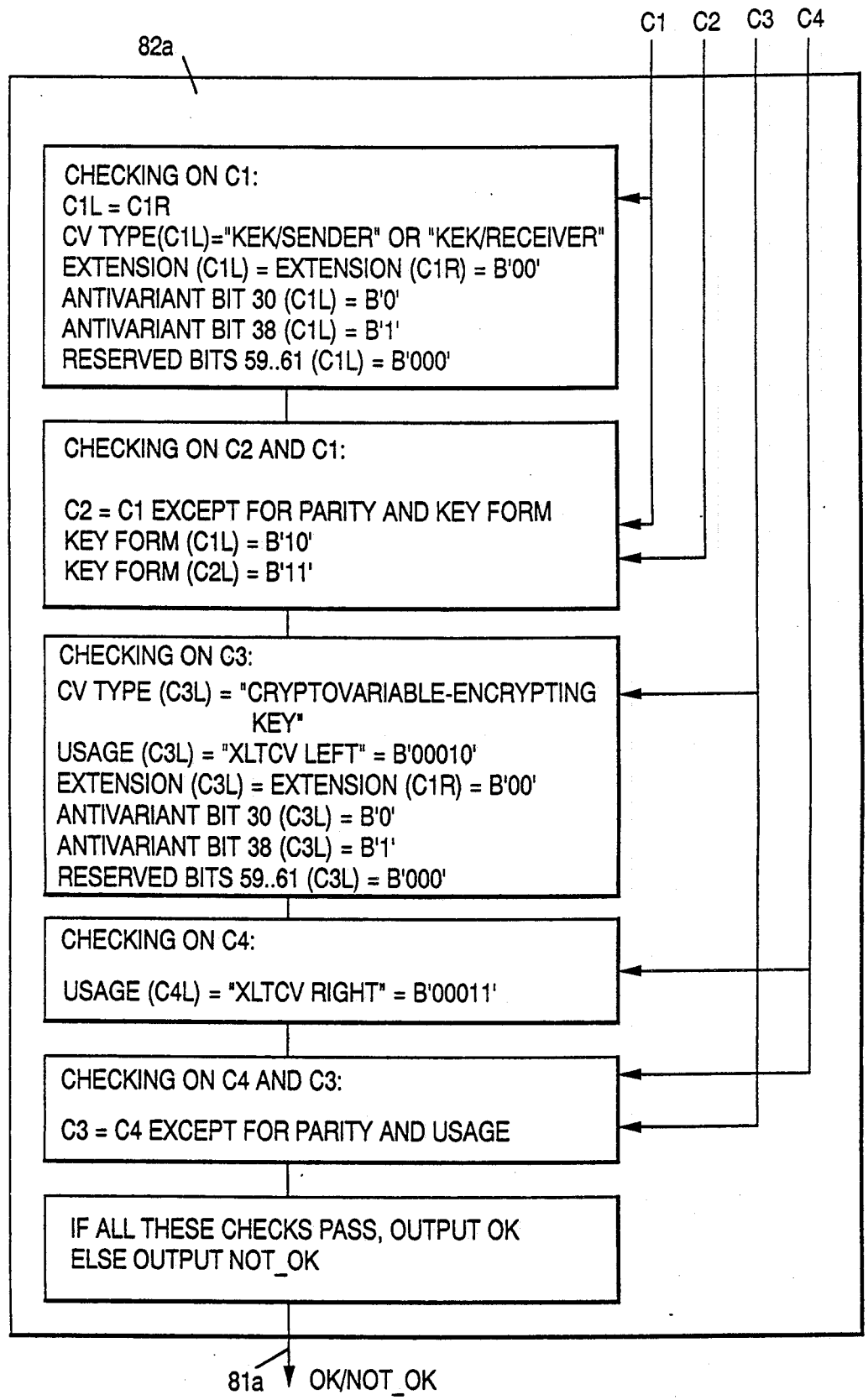
FIG. 10 is a schematic diagram illustrating the normal checking of control vectors C1 through C6 in the control vector checking process.

FIG. 10 provides detail of the normal CV checking and FIG. 11 provides detail of the augmented CV checking or the checking used in the AB vectors.

Figure 12:
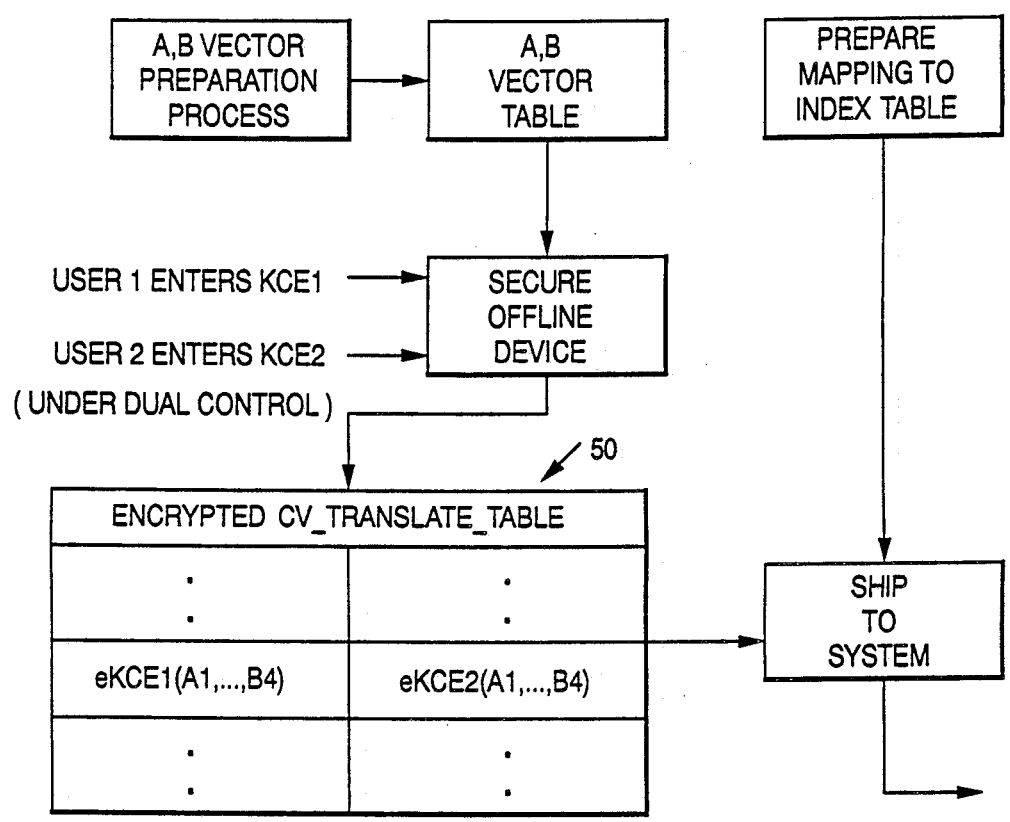
FIG. 12 is a schematic diagram illustrating the off-line creation of the control vector translation table and the mapping table.

FIG. 12 provides a sample description of how a CV translate table and the software mapping table might be created in an off-line procedure by an authorized system administrator or under dual control using two separate security personnel. In this particular case, there is an AB vector preparation process that is essentially where the left side of the control vector translation table is prepared. The A1, B1, A2, B2, A3, B3, B4 vectors are individually compared based upon what translations are required by the system administrator. Upon building that plaintext table, it results in an AB vector table. At the same time, the administrator also prepares a mapping table that provides the appropriate translate parameters in C5 values that will be used by the application programmer to pass to CFAP to map to this particular AB vector table. The AB vector table itself is then introduced into a secure off-line device where under dual control, user 1 may arrive entering his clear cryptovariable encrypting key KCE1 and encrypts the AB vector table to produce the left side of the encrypted CV translate table. He then removes his clear key KCE1. A second user arrives and enters his clear key KCE2 and encrypts the same AB vector table to produce the right-hand side of the encrypted CV translate table. That concatenated table is then shipped to the system where it is installed in a place where it is accessible to the Cryptographic Facility Access Program CFAP.

DETAILED DESCRIPTION OF THE INVENTION

The invention can be embodied as a translate CV (XLTCV) instruction which translates an encrypted key from encryption under a key-encrypting key KK exclusive-ORed with control vector C5 to encryption under the same key KK exclusive-ORed with a different control vector C6. In order to describe this in more detail, the following definitions are provided:

Definitions

Inputs:

parity-adjust:

indicates whether parity must be adjusted on the encrypted output key.
* parity-adjust=1: parity must be adjusted on the encrypted output key.
* parity-adjust=0: parity must not be adjusted on the encrypted output key.

e*KM.C1(KKL):

The 64-bit left half KKL of the 128-bit key-encrypting key KK, encrypted under the master key with a control vector C1.

e*KM.C2(KKR):

The 64-bit right half KKR of the 128-bit key encrypting key KK, encrypted under the master key with a control vector C2.

e*KM.C3(KCE1):

The 64-bit cryptovariable-encrypting key KCE1, encrypted under the master key with a control vector C3. KCE1 is the key that encrypts the left half of the entries of the CV translation table, which specify how the CV is to be translated.

e*KM.C4(KCE2):

The 64-bit cryptovariable-encrypting key KCE2, encrypted under the master key with a control vector C4. KCE2 is the key that encrypts the right half of the entries of the CV translation table, which specify how the CV is to be translated.

eKCE1(A1,B1,A2,B2,A3,B3,B4):

The left half of an entry of the CV translation table, encrypted under KCE1. Each entry of the CV translation table is 1792 bits long. Each half of the entry is 896 bits long, consisting of 7 128-bit vectors A1, B1, A2, B2, A3, B3, and B4 whose values specify how the input control vector is translated. Further descriptions of these vectors can be found below, in the description of the instruction. The two halves of each entry of the table is encrypted under two different keys, KCE1 and KCE2.

eKCE2(A1,B1,A2,B2,A3,B3,B4):

The right half of an entry of the CV translation table, encrypted under KCE2.

e*KK.C5(K):

The key K, input in encrypted form under the key-encrypting KK with the control vector C5 on which a control vector translation is to be performed by the instruction.

C1,C2:

The 128-bit control vectors associated with the left half and the right half of the 128-bit key-encrypting key KK, respectively.

C3:

The 128-bit control vector associated with the 64-bit cryptovariable encrypting key KCE1.

C4:

The 128-bit control vector associated with the 64-bit cryptovariable encrypting key KCE2.

C5:

The 128-bit control vector associated with the key K. C5 is the control vector on which a control vector translation is to be performed by the instruction.

C6:

The 128-bit control vector associated with the key K that is output in encrypted form by the instruction. C6 is the control vector resulted from the control vector translation performed on C5.

e*KK.C6(K):

The key K, output by the instruction in encrypted form under the key-encrypting key KK with control vector C6. C6 is the control vector resulted from the control vector translation performed on C5.

Description of the Translate CV Instruction

The translate CV (XLTCV) instruction translates an encrypted key of the form e*KK.C5(K) to an encrypted key of the form e*KK.C6(K). That is, the key K is translated from encryption under key-encrypting key KK exclusive-ORed with control vector C5 to encryption under the same key KK exclusive-ORed with a different control vector C6. The key-encrypting key KK is defined either as a "sender KEK" or a "receiver KEK." That is, K is input to or output from the instruction in IM (i.e., import) or EX (i.e., export form). The set of allowable CV mappings, i.e., C5 to C6, are defined in a CV translation table, which is specified in advance by authorized installation personnel. An entry of the CV translation table (in encrypted form) must be supplied to the instruction as an input parameter, and the CV translation from C5 to C6 is performed, based on this parameter. The XLTCV is therefore customized and tailored to fit the needs of each installation.

The CV translation table consists of entries of 1792 bits long. Each entry consists of two 896-bit halves. Each half of an entry contains seven 128-bit masking vectors A1, B1, A2, B2, A3, B3, and B4, concatenated in that order and encrypted under a cryptovariable-encrypting key. The left half and the right half of the entries are encrypted under a different cryptovariable-encrypting key, therefore the two halves of each entry are not equal even though they have the same value in clear form. The table below illustrates the form of a CV translation table. Note that for each entry, the masking vectors A1, B1, B2, A3, B3, and B4 are different from one entry to another. In the table below, the masking vectors are denoted as $A1_i$, $B1_i$, etc. ..., for row i.

| The CV Translation Table | |
|---|---|
| $eKCE1(A1_1,B1_1,B2_1,A3_1,B3_1,B4_1)$ | $eKCE2(A1_1,B1_1,B2_1,A3_1,B3_1,B4_1)$ |
| $eKCE1(A1_2,B1_2,A2_2,B2_2,A3_2,B3_2,B4_2)$ | $eKCE2(A1_2,B1_2,B2_2,A3_2,B3_2,B4_2)$ |
| ... | ... |
| ... | ... |

The masking vectors A1, B1 specify certain values for certain bits of the control vector C1, which is associated with the left half of the 128-bit key-encrypting key KK. That is, the user has the option of specifying the instruction to check for certain bits of the control C1 for certain values. Note that this kind of checking is extra, at the request of the user (specified via A1 and B1), not part of standard checkings such as checking for valid CV type, valid RPZ bits. ... If the user does not wish to have extra checking on the control vector C1 (besides the standard checking on C1 by the instruction), he can supply the masking vectors A1 as "don't care" (i.e., any value) and B1 as X'0000000000000000'.

The masking vectors A2, B2, A3, B3, and B4 specify how the control vector C5 is translated into C6. Some examples of possible C5 to C6 translation will be described shortly.

It is recommended that the entries of the CV translation table be prepared off-line at a secure workstation or on-line under secure condition using the encode instruction and clear values of cryptovariable-encrypting keys KCE1 and KCE2. Notice that the encrypted values of KCE1 and KCE2 as supplied (as inputs) to the instruction are obtained only after the installation of KCE1 and KCE2 on the system via combinations of some of the following instructions, which execute only when the Cryptographic Facility is in an authorized state: EMK-E, E1K-E & RTMK, LFKP & CKP. Furthermore, it is recommended that dual control be exercised in the installation of KCE1 and KCE2, so that complete knowledge of KCE1 and KCE2 is not possible for any unauthorized user. Therefore, even though the XLTCV instruction operates in normal operating mode, the instruction cannot be executed to produce meaningful outputs until the keys KCE1 and KCE2 are introduced and the CV translation table is prepared, via authorized installation personnel.

The entries of the CV translation table are managed by CFAP or the application programs. CFAP or application program must know which entry is appropriate to pass to the XLTCV instruction. As part of its operation, the XLTCV instruction deciphers the two halves of the supplied entry, input as eKCE1(A1, B1, A2, B2, A3, B3, B4) and eKCE2(A1, B1, A2, B2, A3, B3, B4), using KCE1 and KCE2, respectively. The deciphered quantities are then compared for equality. If the values are not equal, then the operation is aborted; otherwise, if the values are equal, the operation continues. The instruction then checks for the following relationships, as part of control vector checking (note that the logical operation XOR and AND are performed on a bit-by-bit basis):

1. (C1 XOR A1) AND B1=0 (extra checking on C1 for certain patterns)
2. (C5 XOR A2) AND B2=0 (checking on C5 for certain patterns)
3. (C6 XOR A3) AND B3=0 (checking on C6 for certain patterns)

4. (C5 XOR C6) AND B4=0 (checking on C5 and C6 for equality except for certain bits)

Only if the above relationships are satisfied, then C6 is a valid translation of C5. Examples of possible C5 to C6 translations are:

---

* Translate any C5 to any C6. The values of the masking vectors A2, B2, A3, B3 and B4 are:
  A2 = "don't care" (i.e., any value)
  B2 = X'00 00 00 00 00 00 00 00 00 00 00 00 00 00 00 00'
  A3 = "don't care" (i.e., any value)
  B3 = X'00 00 00 00 00 00 00 00 00 00 00 00 00 00 00 00'
  B4 = "don't care" (i.e., any value).
* Translate any C5 to C6=0. The values of the masking vectors A2, B2, A3, B3 and B4 are:
  A2 = "don't care" (i.e., any value)
  B2 = X'00 00 00 00 00 00 00 00 00 00 00 00 00 00 00 00'
  A3 = X'00 00 00 00 00 00 00 00 00 00 00 00 00 00 00 00'
  B3 = X'FF FF FF FF FF FF FF FF FF FF FF FF FF FF FF FF'
  B4 = X'00 00 00 00 00 00 00 00 00 00 00 00 00 00 00 00'
* Translate C5=0 to any C6. The values of the masking vectors A2, B2, A3, B3 and B4 are:
  A2 = X'00 00 00 00 00 00 00 00 00 00 00 00 00 00 00 00'
  B2 = X'FF FF FF FF FF FF FF FF FF FF FF FF FF FF FF FF'
  A3 = "don't care" (i.e., any value),
  B3 = X'00 00 00 00 00 00 00 00 00 00 00 00 00 00 00 00'
  B4 = X'00 00 00 00 00 00 00 00 00 00 00 00 00 00 00 00'
* Test that C5=C6. The value of the masking vectors A2, B2, A3, B3 and B4 are:
  A2 = "don't care" (i.e., any value),
  B2 = X'00 00 00 00 00 00 00 00 00 00 00 00 00 00 00 00'
  A3 = "don't care" (i.e., any value),
  B3 = X'00 00 00 00 00 00 00 00 00 00 00 00 00 00 00 00'
  B4 = X'FF FF FF FF FF FF FF FF FF FF FF FF FF FF FF FF'
* Translate C5 to C6=C5 except in CV type, key form and parity fields (i.e., except in bits 7, 8..15, 23, 31, 39, 40..42, 47, 55, 63). The value of the masking vectors A2, B2, A3, B3, and B4 are:
  A2 = "don't care" (i.e., any value),
  B2 = X'00 00 00 00 00 00 00 00 00 00 00 00 00 00 00 00'
  A3 = "don't care" (i.e., any value),
  B3 = X'00 00 00 00 00 00 00 00 00 00 00 00 00 00 00 00'
  B4 = X'FE 00 FE FE FE 1E FE FE FE FE FE FE FE FE FE FE'

---

Note that the CV translation table does not necessarily contain all entries that would allow all possible translations. The table needs to contain only the entries that would allow translations that are meaningful and useful to the owner or authorized users of the system.

Specification of Control Vectors

The control vectors supplied by CFAP to the instruction must be prepared as follows:

1. Specification of C1
   * For the left half C1L of C1:
     a. CV TYPE must be "KEK/sender" or "KEK/receiver"
     b. KEY FORM (bits 40..42)=B'010' or B'110'
     c. KEY PART (bit 44)=B'0'
     d. EXTENSION (bits 45.46)='B'0'
     e. Three RPZ (reserved, tested for zero) bits (at locations 59..61) must be B'000'
     f. ANTIVARIANT bits must have valid value, i.e. C1L(30)=B'0' and C1L(38)=B'1'
     g. The remaining bits of C1L might be checked or might not be checked by the Cryptographic Facility, depending on the values of the masking vectors A1 and B1. It's up to CFAP to supply proper values for these bits. It's up to CFAP to set values for these bits.
   * For the right half C1R of C1:
     a. If the EXTENSION field (bits 45..46) of C1L is B'00' then C1R must be the same as C1L.
     b. If the EXTENSION field of C1L is B'01' then EXTENSION TYPE(C1R) must be either "reserved" or "CFAP type 1".
     c. (Optional). If EXTENSION of C1L is B'01' and EXTENSION TYPE(C1R) is B'0000000' or B'0000001' then the value of the P-INDICATOR field (i.e., bits 42..44) of C1R should meet the condition.

$0 < \text{P-INDICATOR} < 6$ d. The remaining bits of C1R might be checked or might not be checked by the Cryptographic Facility, depending on the values of the masking vectors A1 and B1. It's up to CFAP to supply proper values for these bits.

2. Specification of C2
   a. C2 must be equal to C1 except for the KEY FORM and PARITY fields.
   b. The KEY FORM (bits 40..42) of C2L must be either B'001' or B'101', and must be agreeable to the KEY FORM of C1L. That is, if KEY FORM(C1L)=B'010' then KEY FORM(C2L)=B'001'; if KEY FORM(C1L)=B'110' then KEY FORM(C2L)=B'101'.

3. Specification of C3
   * For the left half C3L of C3:
     a. CV TYPE must be "cryptovariable-encrypting key"
     b. USAGE (bits 18..22) must be B'00010' (i.e., USAGE="XLTCV left")
     c. CRYPTOVARIABLE FORM (bits 40..42)=B'000'
     d. KEY PART (bit 44)=B'0' e. EXTENSION (bits 45..46)=B'00'
f. Three RPZ (reserved, tested for zero) bits (at locations 59..61) must be B'000'
g. ANTIVARIANT bits must have valid value, i.e. C3(30)=B'0' and C3(38)=B'1'.
h. The remaining bits of C3L are not checked by the Cryptographic Facility. It is up to CFAP to set values for these bits.
* For the right half C3R of C3:
  a. If the EXTENSION field (bits 45..46) of C3L is B'00' then C3R must be same as C3L.
  b. If the EXTENSION field of C3L is B'01' then EXTENSION TYPE(C3R) must be either "Reserved" of "CFAP type 1".
  c. (Optional). If EXTENSION of C3L is B'01' and EXTENSION TYPE(C3R) is B'0000000' or B'0000001' then the value of the P-INDICATOR field (i.e., bits 42..44) of C3R should meet the condition:

0 < P-INDICATOR < 6 d. The remaining bits of C3R are not checked by the Cryptographic Facility. It is up to CFAP to set values for these bits. See section 'CFAP' of CCA/1 Vol. 5, "Software Interfaces."
4. Specification of C4
  a. C4 must be equal to C3 except for the USAGE and PARITY fields.
  b. The USAGE fields (bits 40..42) of C4L must be B'00011' (i.e., USAGE='XLTCV right').
5. Specification of C5 and C6

The Cryptographic Facility might check for certain patterns in C5 and C6, depending on the values of the masking vectors A2, B2, A3, B3 and B4. It is up to CFAP to specify proper values for C5 and C6.

Control Vector Checking

1. Check the vector (A1, B1, A2, B2, A3, B3, B4) recovered by decrypting eKCE1(A1, B1, A2, B2, A3, B3, B4) with KCE1 is equal to the vector (A1, B1, A2, B2, A3, B3, B4) recovered by decrypting eKCE2(A1, B1, A2, B2, A3, B3, B4) with KCE2.
2. Checking on C1 (associated with KKL)
* CV TYPE (C1L)="KEK/sender" or "KEK/receiver"
* Perform checking rule CVCHKCM0(C1) on C1 to ensure that the following fields are valid: KEY PART, EXTENSION, ANTIVARIANT, RESERVED AND TESTED bits.
* Check that (C1 XOR A1)AND B1=0bit-by-bit).
3. Checking on C2 (associated with KKR) and C1
* Perform checking rule CVCHKCM3(C1,C2) to ensure that C2=C1 except for KEY FORM and PARITY, and that KEY FORM of C1 and C2 are valid.
4. Checking on C3 (associated with KCE1)
* CV TYPE(C3L)="Cryptovariable-encrypting key"
* USAGE (bits 18..22) of C3L="XLTCV left"=B'00010'
* CRYPTOVARIABLE FORM (bits 40.42) of C3L=B'000 (single length key only)
* Perform checking rule CVCHKCM0(C3) on C3 to ensure that the following fields are valid: KEY PART, EXTENSION, ANTIVARIANT, RESERVED AND TESTED bits.
5. Checking on C4 (associated with KCE2)
* USAGE (bits 18..22) of C4L="XLTCV right"=B'00011'
6. Checking on C4 and C3
* Checking that C3=C4 except for the 5-bit encoded (USAGE field (bits 18.22) and PARITY bits (bits (k* 8)-1, k=1,2,3 ... 16).

Note: If the parity of control vectors is always checked as part of control vector checking, then the above checking can be simplified to checking for C3=C4 except bits 18..22.
7. Checking on C5 (the CV to be translated)
* Check that (C5 XOR A2)AND B2=0
8. Checking on C6 (the translated CV)
* Check that (C6 XOR A3)AND B3=0
9. Checking on C5 and C6
* Check that (C5 XOR C6)AND B4=0

CC

1. Successful completion
2. The plaintext recovered from the two encrypted halves of the supplied entry of the CV translation table do not match
3. C1 is invalid
4. C2 is invalid
5. C3 is invalid
6. C4 is invalid
7. C5 is invalid
8. Unsuccessful operation (error)

The resulting cryptographic system and method provides a secure method for a compatible key management in a cryptographic network supporting a variety of key distribution protocols. It provides a flexible and secure method for controlling key usage using control vectors in a heterogeneous key distribution environment.

Although a specific embodiment of the invention has been disclosed, it will be understood by those having skill in the art that changes can be made in that specific embodiment without departing from the spirit and scope of the invention.

What is claimed is:

1. In a data processing system which includes a control vector based cryptographic facility, a method for translating from a first control vector to a second control vector, comprising the steps of:

storing a masking vector corresponding to the relationship between said first control vector and said second control vector, in a table in a first form encrypted with a first encrypting key and in a second form encrypted with a second encrypting key;

inputting a working key encrypted under a key encrypting key exclusive-ORed with said first control vector;

inputting said first control vector and inputting said second control vector into which said first control vector is to be translated;

recovering said working key and continuing said method for translation only if said first control vector satisfies control vector checking;

accessing said first encrypted form and said second encrypted form of said masking vector from said table;

decrypting said first encrypted form of said masking vector and comparing the result with the result of decrypting said second form of said masking vector, and continuing said method for translating only if both results are the same;

logically combining said first control vector and said
masking vector producing a logical product and
continuing said method for translation only if said
logical product satisfies logical product checking;
outputting said working key encrypted under said
key encrypting key exclusive-ORed with said second control vector.

2. The method of claim 1, wherein said first control vector defines a primary set of uses for said working key and said masking vector defines a subset of said primary set of uses.

3. The method of claim 1, wherein said first control vector defines a primary set of users for said working key and said masking vector defines a subset of said primary set of users.

4. In a network including a first data processing system which has a first control vector based cryptographic facility using a first control vector, said network further including a second data processing system which has a second control vector based cryptographic facility, a method for translating from said first control vector to a second control vector for use in said second data processing system, comprising the steps of:
storing a masking vector corresponding to the relationship between said first control vector and said second control vector, in a table in a first form encrypted with a first encrypting key and in a second form encrypted with a second encrypting key;
inputting a working key encrypted under a key encrypting key exclusive-ORed with said first control vector;
inputting said first control vector and inputting said second control vector into which said first control vector is to be translated;
recovering said working key and continuing said method for translation only if said first control vector satisfies control vector checking;
accessing said first encrypted form and said second encrypted form of said masking vector from said table;
decrypting said first encrypted form of said masking vector and comparing the result with the result of decrypting said second form of said masking vector, and continuing said method for translating only if both results are the same;
logically combining said first control vector and said masking vector producing a logical product and continuing said method for translation only if said logical product satisfies logical product checking;
outputting said working key encrypted under said key encrypting key exclusive-ORed with second control vector.

5. The method of claim 4, wherein said first control vector defines a primary set of uses for said working key in said first data processing system and said masking vector defines a subset of said primary set of uses in said second data processing system.

6. The method of claim 4, wherein said first control vector defines a primary set of users for said working key in said first data processing system and said masking vector defines a subset of said primary set of users in said second data processing system.

7. In a network including a first data processing system which does not have a control vector based cryptographic facility, said network further including a second data processing system which has a control vector based cryptographic facility, a method for forming a control vector for use in said second data processing system, said control vector to be associated with a working key received from said first data processing system, comprising the steps of:
storing a masking vector corresponding to said control vector, in a table in a first form encrypted with a first encrypting key and in a second form encrypted with a second encrypting key;
inputting said working key;
inputting inputting said control vector;
accessing said first encrypted form and said second encrypted form of said masking vector from said table;
decrypting said first encrypted form of said masking vector and comparing the result with the result of decrypting said second form of said masking vector, and continuing said method for translating only if both results are the same;
logically combining said control vector and said masking vector producing a logical product and continuing said method for translation only if said logical product satisfies logical product checking;
outputting said working key encrypted under a key encrypting key exclusive-ORed with said control vector.

8. The method of claim 7, wherein said masking vector defines a set of uses for said working key in said second data processing system.

9. The method of claim 7, wherein said masking vector defines a set of users for said working key in said second data processing system.

10. In a network including a first data processing system which has a first control vector based cryptographic facility using a first control vector, said network further including a second data processing system which has a second control vector based cryptographic facility, a method for translating from said first control vector to a plurality of control vectors for use in said second data processing system, comprising the steps of:
storing a first masking vector corresponding to the relationship between said first control vector and a second control vector, in a table in a first form encrypted with a first encrypting key and in a second form encrypted with a second encrypting key;
storing a second masking vector corresponding to the relationship between said first control vector and a third control vector, in a table in a first form encrypted with a first encrypting key and in a second form encrypted with a second encrypting key;
inputting a working key encrypted under a key encrypting key exclusive-ORed with said first control vector;
inputting said first control vector and inputting said second control vector into which said first control vector is to be translated;
recovering said working key and continuing said method for translation only if said first control vector satisfies control vector checking;
accessing said first encrypted form and said second encrypted form of said first masking vector from said table;
decrypting said first encrypted form of said first masking vector and comparing the result with the result of decrypting said second form of said first masking vector, and continuing said method for translating only if both results are the same;
logically combining said first control vector and said first masking vector producing a first logical product and continuing said method for translation only if said first logical product satisfies logical product checking;

outputting said working key encrypted under said key encrypting key exclusive-ORed with said second control vector;

inputting said third control vector into which said first control vector is to be translated;

accessing said first encrypted form and said second encrypted form of said second masking vector from said table;

decrypting said first encrypted form of said second masking vector and comparing the result with the result of decrypting said second form of said second masking vector, and continuing said method for translating only if both results are the same;

logically combining said first control vector and said second masking vector producing a second logical product and continuing said method for translation only if said second logical product satisfies logical product checking;

outputting said working key encrypted under said key encrypting key exclusive-ORed with said third control vector.

11. The method of claim 10, wherein said first control vector defines a primary set of uses for said working key in said first data processing system and said first masking vector defines a first subset of said primary set of uses in said second data processing system and said second masking vector defines a second subset of said primary set of uses in said second data processing system.

12. The method of claim 10, wherein said first control vector defines a primary set of users for said working key in said first data processing system and said first masking vector defines a first subset of said primary set of users in said second data processing system and said second masking vector defines a second subset of said primary set of users in said second data processing system.

13. In a data processing system which has a control vector based cryptographic facility, a method for translating from a first control vector to a plurality of control vectors, comprising the steps of:

storing a first masking vector corresponding to the relationship between said first control vector and a second control vector, in a table in a first form encrypted with a first encrypting key and in a second form encrypted with a second encrypting key;

storing a second masking vector corresponding to the relationship between said first control vector and a third control vector, in a table in a first form encrypted with a first encrypting key and in a second form encrypted with a second encrypting key;

inputting a working key encrypted under a key encrypting key exclusive-ORed with said first control vector;

inputting said first control vector and inputting said second control vector into which said first control vector is to be translated;

recovering said working key and continuing said method for translation only if said first control vector satisfies control vector checking;

accessing said first encrypted form and said second encrypted form of said first masking vector from said table;

decrypting said first encrypted form of said first masking vector and comparing the result with the result of decrypting said second form of said first masking vector, and continuing said method for translating only if both results are the same;

logically combining said first control vector and said first masking vector producing a first logical product and continuing said method for translation only if said first logical product satisfies logical product checking;

outputting said working key encrypted under said key encrypting key exclusive-ORed with said second control vector;

inputting said third control vector into which said first control vector is to be translated;

accessing said first encrypted form and said second encrypted form of said second masking vector from said table;

decrypting said first encrypted form of said second masking vector and comparing the result with the result of decrypting said second form of said second masking vector, and continuing said method for translating only if both results are the same;

logically combining said first control vector and said second masking vector producing a second logical product and continuing said method for translation only if said second logical product satisfied logical product checking;

outputting said working key encrypted under said key encrypting key exclusive-ORed with said third control vector.

14. The method of claim 13, wherein said first control vector defines a primary set of uses for said working key and said first masking vector defines a first subset of said primary set of uses and said second masking vector defines a second subset of said primary set of uses.

15. The method of claim 13, wherein said first control vector defines a primary set of users for said working key and said first masking vector defines a first subset of said primary set of users and said second masking vector defines a second subset of said primary set of users.

16. In a data processing system which includes a control vector based cryptographic facility, an apparatus for translating from a first control vector to a second control vector, comprising:

a storage for storing a masking vector corresponding to the relationship between said first control vector and said second control vector, in a table in a first form encrypted with a first encrypting key and in a second form encrypted with a second encrypting key;

a first input means for inputting a working key encrypted under a key encrypting key exclusive ORed with said first control vector;

a second input means for inputting said first control vector and inputting said second control vector into which said first control vector is to be translated;

a key recovery means coupled to said first and second input means, for recovering said working key and continuing said method for translation only if said first control vector satisfies control vector checking;

a decrypting means coupled to said storage decrypting said first encrypted form of said masking vector and comparing the result with the result of decrypting said second form of said masking vector, and continuing said method for translating only if both results are the same;

a logic means coupled to said second input means and to said decrypting means, for logically combining said first control vector and said masking vector producing a logical product and continuing said method for translation only if said logical product satisfies logical product checking;

an output means coupled to said second input means, to said recover means and to said logic means, for outputting said working key encrypted under said key encrypting key exclusive-ORed with said second control vector.

17. The apparatus of claim 16, wherein said first control vector defines a primary set of uses for said working key and said masking vector defines a subset of said primary set of uses.

18. The apparatus of claim 16, wherein said first control vector defines a primary set of users for said working key and said masking vector defines a subset of said primary set of users.

19. In a data processing system in which a first processor outputs cryptographic keys which are associated with first control vectors defining first functions which each key is allowed by its originator to perform in said first processor, an apparatus for translating said first control vectors into second control vectors defining second functions which each key is allowed to perform in a second processor in said system, comprising:

a control vector mapping means having an input coupled to said first processor, for receiving said first control vector and in response thereto for outputting said second control vector at an output thereof;

a control vector checking means having an input coupled to said first processor for receiving said first control vector and an input coupled to said mapping means for receiving said second control vector, for checking whether said second control vector is allowed to be translated from said first control vector, and outputting a first validity signal at an output thereof;

a control vector translation table having an input coupled to said first processor, and storing masking vectors, and having an output for outputting at least one masking vector corresponding to said first control vector input at the input thereof;

a masking vector checking means having an input connected to the output of said control vector translation table and a second input coupled to said first processor for receiving said first control vector, and a third input coupled to said output of said mapping means for receiving said second control vector, for logically combining said first control vector and said masking vector and comparing the result thereof with said second control vector to determine whether said translation from said first control vector to said second control vector is allowed, and outputting a second validation signal;

an AND gate coupled to said control vector checking means and to said masking vector checking means, for ANDing said first and said second validation signals to provide a gating signal to gate said second control vector out to said second processor for use with said associated cryptographic key at said second processor.

* * * * *